United States Patent
Nakamura et al.

(10) Patent No.: US 11,756,215 B2
(45) Date of Patent: Sep. 12, 2023

(54) IMAGE PROCESSING DEVICE, IMAGE PROCESSING METHOD, AND IMAGE PROCESSING PROGRAM

(71) Applicant: NIPPON TELEGRAPH AND TELEPHONE CORPORATION, Tokyo (JP)

(72) Inventors: Daiki Nakamura, Musashino (JP); Hiroaki Gomi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 246 days.

(21) Appl. No.: 17/310,237

(22) PCT Filed: Jan. 15, 2020

(86) PCT No.: PCT/JP2020/001000
§ 371 (c)(1),
(2) Date: Jul. 27, 2021

(87) PCT Pub. No.: WO2020/158382
PCT Pub. Date: Aug. 6, 2020

(65) Prior Publication Data
US 2022/0130057 A1 Apr. 28, 2022

(30) Foreign Application Priority Data
Jan. 28, 2019 (JP) .................................. 2019-012524

(51) Int. Cl.
*G06K 9/00* (2022.01)
*G06T 7/262* (2017.01)
*G06T 7/269* (2017.01)

(52) U.S. Cl.
CPC .............. *G06T 7/262* (2017.01); *G06T 7/269* (2017.01); *G06T 2207/10016* (2013.01); *G06T 2207/20056* (2013.01); *G06T 2207/30244* (2013.01)

(58) Field of Classification Search
CPC ..................... G06T 7/262; G06T 7/269; G06T 2207/10016; G06T 2207/20056; G06T 2207/30244; G06T 7/246; H04N 23/60
See application file for complete search history.

(56) References Cited

U.S. PATENT DOCUMENTS 5,189,518 A 2/1993 Nishida
5,617,166 A * 4/1997 Amanuma ............. G03B 17/00
                                                                396/55
(Continued)

FOREIGN PATENT DOCUMENTS

JP    H04117077 A    4/1992
JP    H05233815 A    9/1993

OTHER PUBLICATIONS

Bruce D. Lucas et al., An Iterative Image Registration Technique with an Application to Stereo Vision, Proceedings of Imaging Understanding Workshop, Apr. 1981, pp. 121-130.

(Continued)

*Primary Examiner* — Shervin K Nakhjavan
(74) *Attorney, Agent, or Firm* — XSENSUS LLP (57) ABSTRACT

To achieve a video processing apparatus, a video processing method, and a video processing program capable of relatively accurately estimating, from a moving image, a motion of a camera that has captured the moving image, and reducing a calculation load, a video processing apparatus (100) according to the present disclosure includes a spatial frequency filter unit (10) configured to extract a low spatial frequency component of a moving image, and an angular velocity calculation unit (70) configured to calculate angular (Continued)

velocity of a camera that has captured the moving image, based on the moving image that has been passed through the spatial frequency filter unit (10).

7 Claims, 7 Drawing Sheets

(56) References Cited

U.S. PATENT DOCUMENTS

| | | | | |
|---|---|---|---|---|
| 6,160,959 | A * | 12/2000 | Mizumoto | G03B 5/00 |
| | | | | 396/55 |
| 6,734,901 | B1 * | 5/2004 | Kudo | H04N 23/6815 |
| | | | | 348/208.4 |
| 6,741,652 | B1 | 5/2004 | Kondo et al. | |
| 9,854,167 | B2 * | 12/2017 | Uchida | H04N 23/6812 |
| 10,277,809 | B2 * | 4/2019 | Wakamatsu | H04N 23/681 |
| 2006/0110147 | A1 * | 5/2006 | Tomita | H04N 23/682 |
| | | | | 348/E5.045 |
| 2010/0177198 | A1 * | 7/2010 | Hayashi | H04N 23/68 |
| | | | | 348/E5.031 |
| 2010/0245604 | A1 * | 9/2010 | Ohmiya | H04N 23/683 |
| | | | | 348/208.99 |
| 2011/0206236 | A1 * | 8/2011 | Center, Jr. | G06T 7/593 |
| | | | | 382/103 |
| 2015/0326785 | A1 * | 11/2015 | Tsubaki | H04N 23/68 |
| | | | | 348/208.2 |
| 2015/0350497 | A1 * | 12/2015 | Gamadia | H04N 23/58 |
| | | | | 348/373 |
| 2016/0248980 | A1 * | 8/2016 | Krey | G02B 27/646 |
| 2017/0013198 | A1 * | 1/2017 | Wada | G03B 5/00 |
| 2017/0187960 | A1 * | 6/2017 | Tsuchiya | H04N 23/73 |
| 2017/0214855 | A1 * | 7/2017 | Miyazawa | H04N 23/682 |
| 2017/0358115 | A1 * | 12/2017 | Kaida | G06T 7/32 |
| 2018/0213153 | A1 * | 7/2018 | Iso | G06T 5/006 |
| 2018/0324358 | A1 * | 11/2018 | Yamada | H04N 23/73 |
| 2019/0208127 | A1 * | 7/2019 | Murakami | G02B 27/646 |
| 2019/0281221 | A1 * | 9/2019 | Kuwahara | H04N 5/265 |

OTHER PUBLICATIONS

Daiki Nakamura et al., Statistical analysis of optic flow induced by body motion characterizing OFR and MFR, Joint workshop of UCL-ICN,NTT,UCL-Gatsby,and AIBS Analysis and Synthesis for Human/Artificial Cognition and Behaviour, Oct. 22, 2018.
Gary Bradski et al., Detailed explanation OpenCV: Image processing / recognition using computer vision library, Aug. 2009, translated by Koichi Matsuda.
Hiroaki Gomi et al., Specificities of manual and ocular following responses and natural statistics of optic flow induced by body movements, 41st Japan Neuroscience Society, Jul. 26, 2018.
labs.eecs.tottori-u.ac.jp, Retrieved on Nov. 22, 2018, from URL: http://labs.eecs.tottori-u.ac.jp/sd/Member/pyamada/OpenCV/html/py_tutorials/py_calib3d/py_epipolar_geometry/py_epipolar_geometry.html.
web.wakayama-u.ac.jp, Published on May 7, 1999, from URL: http://web.wakayama-u.ac.jp/~wuhy/CV10.pdf.
www.jnss.org, Published on Jul. 6, 2018, from URL: http://www.jnss.org/abstract/neuro2018/meeting_planner/sessiondetail.php?st_id=201811513&u_s_id=3P-LBA&pset-O&u-88fc861d0827b95766c76144b67cd4bf&yz=9337&yzs!=16791.
Mar. 3, 2020, International Search Report issued in the International Patent Application No. PCT/JP2020/001000.
labs.eecs.tottori-u.ac.jp, Retrieved on Nov. 22, 2018, from URL: http://www.jnss.org/abstract/neuro2018/meeting_planner/sessiondetail.php? st_id=201811513&u_s_id=3PLBA&pset=O&u=88fc861d0827b95766c76144b67cd4bf&yz=9337&yzsl=16791.
www.jnss.org, Published on Jul. 6, 2018, from URL: http://www.jnss.org/abstract/neuro2018/meeting_planner/sessiondetail.php?st_id=201811513&u_s_id=3P-LBA&pset-O&u-88fc861d0827b95766c76144b67cd4bf&yz=9337&yzsl-16791.

* cited by examiner

| SPATIAL FREQUENCY BAND | NO BAND LIMITATION (COMPARATIVE EXAMPLE 1) | 0.1 cpd OR LESS (EXAMPLE 1) | BALL PLAY  $1\ cpd = \frac{82}{640}\ cycle/pixel$ 0.1 TO 0.4 cpd (EXAMPLE 2) | 0.4 cpd OR GREATER (COMPARATIVE EXAMPLE 2) |
|---|---|---|---|---|
| VIDEO EXAMPLE |  |  | | |
| CORRELATION COEFFICIENT: $\overline{\nu}_x(t)$ vs $\omega_y(t)$ | 0.51 | 0.69 | 0.39 | 0.16 |
| CORRELATION COEFFICIENT: $\overline{\nu}_y(t)$ vs $\omega_x(t)$ | 0.49 | 0.73 | 0.56 | 0.13 |

| SPATIAL FREQUENCY BAND | NO BAND LIMITATION (COMPARATIVE EXAMPLE 1) | 0.1 cpd OR LESS (EXAMPLE 1) | TAKING A WALK (OUTSIDE)  $1\ cpd = \frac{82}{640}\ cycle/pixel$ 0.1 TO 0.4 cpd (EXAMPLE 2) | 0.4 cpd OR GREATER (COMPARATIVE EXAMPLE 2) |
|---|---|---|---|---|
| VIDEO EXAMPLE |  |  | | |
| CORRELATION COEFFICIENT: $\overline{\nu}_x(t)$ vs $\omega_y(t)$ | 0.32 | 0.61 | 0.32 | 0.14 |
| CORRELATION COEFFICIENT: $\overline{\nu}_y(t)$ vs $\omega_x(t)$ | 0.42 | 0.67 | 0.43 | 0.18 |

FIG. 5A

VISUAL RECOGNITION OF CONFERENCE POSTER   1 cpd = $\frac{82}{640}$ cycle / pixel

| SPATIAL FREQUENCY BAND | NO BAND LIMITATION (COMPARATIVE EXAMPLE 1) | 0.1 cpd OR LESS (EXAMPLE 1) | 0.1 TO 0.4 cpd (EXAMPLE 2) | 0.4 cpd OR GREATER (COMPARATIVE EXAMPLE 2) |
|---|---|---|---|---|
| VIDEO EXAMPLE | | | | |
| CORRELATION COEFFICIENT: $\overline{\nu}_x(t)$ vs $\omega_y(t)$ | 0.53 | 0.81 | 0.82 | 0.54 |
| CORRELATION COEFFICIENT: $\overline{\nu}_y(t)$ vs $\omega_x(t)$ | 0.64 | 0.78 | 0.65 | 0.29 |

JOGGING (HALLWAY)   1 cpd = $\frac{82}{640}$ cycle / pixel

| SPATIAL FREQUENCY BAND | NO BAND LIMITATION (COMPARATIVE EXAMPLE 1) | 0.1 cpd OR LESS (EXAMPLE 1) | 0.1 TO 0.4 cpd (EXAMPLE 2) | 0.4 cpd OR GREATER (COMPARATIVE EXAMPLE 2) |
|---|---|---|---|---|
| VIDEO EXAMPLE | | | | |
| CORRELATION COEFFICIENT: $\overline{\nu}_x(t)$ vs $\omega_y(t)$ | 0.55 | 0.72 | 0.54 | 0.18 |
| CORRELATION COEFFICIENT: $\overline{\nu}_y(t)$ vs $\omega_x(t)$ | 0.25 | 0.58 | 0.50 | 0.25 |

FIG. 5B

PLAYING CATCH

| SPATIAL FREQUENCY BAND | NO BAND LIMITATION (COMPARATIVE EXAMPLE 1) | 0.1 cpd OR LESS (EXAMPLE 1) | 0.1 TO 0.4 cpd (EXAMPLE 2) | 0.4 cpd OR GREATER (COMPARATIVE EXAMPLE 2) |
|---|---|---|---|---|
| $1\ cpd = \frac{82}{640}\ cycle/pixel$ | | | | |
| VIDEO EXAMPLE | | | | |
| CORRELATION COEFFICIENT: $\overline{\nu}_x(t)$ vs $\omega_y(t)$ | 0.28 | 0.42 | 0.17 | 0.10 |
| CORRELATION COEFFICIENT: $\overline{\nu}_y(t)$ vs $\omega_x(t)$ | 0.13 | 0.72 | 0.54 | 0.18 |

CATCHING GROUNDER

| SPATIAL FREQUENCY BAND | NO BAND LIMITATION (COMPARATIVE EXAMPLE 1) | 0.1 cpd OR LESS (EXAMPLE 1) | 0.1 TO 0.4 cpd (EXAMPLE 2) | 0.4 cpd OR GREATER (COMPARATIVE EXAMPLE 2) |
|---|---|---|---|---|
| $1\ cpd = \frac{82}{640}\ cycle/pixel$ | | | | |
| VIDEO EXAMPLE | | | | |
| CORRELATION COEFFICIENT: $\overline{\nu}_x(t)$ vs $\omega_y(t)$ | 0.31 | 0.43 | 0.28 | 0.22 |
| CORRELATION COEFFICIENT: $\overline{\nu}_y(t)$ vs $\omega_x(t)$ | 0.18 | 0.59 | 0.43 | 0.17 |

FIG. 5C

IMAGE PROCESSING DEVICE, IMAGE PROCESSING METHOD, AND IMAGE PROCESSING PROGRAM

TECHNICAL FIELD

The present disclosure relates to a video processing apparatus, a video processing method, and a video processing program capable of estimating, from a moving image, a motion of a camera that has captured the moving image.

BACKGROUND ART

In recent years, a technology for calculating, from a moving image, angular velocity and the like of a camera that has captured the moving image has been developed. For example, NPLs 1 through 3 discloses an estimation, by epipolar geometry, of translational velocity and angular velocity of a camera. These techniques can be employed for the visuomotor study and can be used to correct camera shake to provide a viewer with an easily visible video.

CITATION LIST

Non Patent Literature

NPL 1: "Epipolar Geometry," [online], 2018, [Searched on Nov. 22, 2018], Internet <URL: http://labs.eecs.tottori-u.ac.jp/sd/Member/oyamada/OpenCV/html/py_tutorials/py_calib3d/py_epipolar_geometry/py_epipolar_geometry.html>

NPL 2: Jun Sato, "Computer Vision—Visual Geometry," CORONA PUBLISHING CO., LTD.

NPL 3: Written by Gary Bradski & Adrian Kaehler, translated by Koichi Matsuda, "Detailed explanation OpenCV—image processing and recognition that uses a computer vision library," O'Reilly Japan, Inc.

NPL 4: B. D. Lucas & T. Kanade, "An Iterative Image Registration Technique with an Application to Stereo Vision," Proceedings of Imaging Understanding Workshop (1981), p. 121-130

SUMMARY OF THE INVENTION

Technical Problem

However, in NPLs 1 through 3, there is a problem in that epipolar geometry is used to estimate translation velocity and angular velocity of a camera, and thus, a calculation load for detection of a corresponding point between frames and the like is large.

A method for reducing the calculation load can include a method of estimating a motion vector from a video by using a luminance gradient method to estimate, based on an estimated result, the translation velocity and angular velocity of the camera, as described in NPL 4. However, in this case, there is a problem in that estimation accuracy of the translation velocity and angular velocity of the camera is reduced as a result of being highly affected by a motion vector independent of the translation velocity and angular velocity of the camera.

Thus, an object of the present disclosure that has been made in view of such a point is to achieve a video processing apparatus, a video processing method, and a video processing program capable of relatively accurately estimating, from a moving image, a motion of a camera that has captured the moving image, and reducing a calculation load compared to the methods using epipolar geometry.

Means for Solving the Problem

To solve the above-described problem, a video processing apparatus according to the present disclosure includes a spatial frequency filter unit configured to extract a low spatial frequency component of a moving image, and an angular velocity calculation unit configured to calculate angular velocity of a camera that has captured the moving image, based on the moving image that has been passed through the spatial frequency filter unit.

To solve the above-described problem, a video processing method according to the present disclosure includes extracting a low spatial frequency component of a moving image, and calculating angular velocity of a camera that has captured the moving image, based on the moving image obtained by extracting a low spatial frequency component.

To solve the above-described problem, a video processing program according to the present disclosure causes a computer to operate as the above-described video processing apparatus.

Effects of the Invention

According to the present disclosure, it is possible to achieve a video processing apparatus, a video processing method, and a video processing program capable of relatively accurately estimating, from a moving image, a motion of a camera that has captured the moving image, and reducing a calculation load.

DESCRIPTION OF EMBODIMENTS

A video processing apparatus 100 according to an embodiment of the present disclosure will be described below with reference to the drawings.

Figure 1:
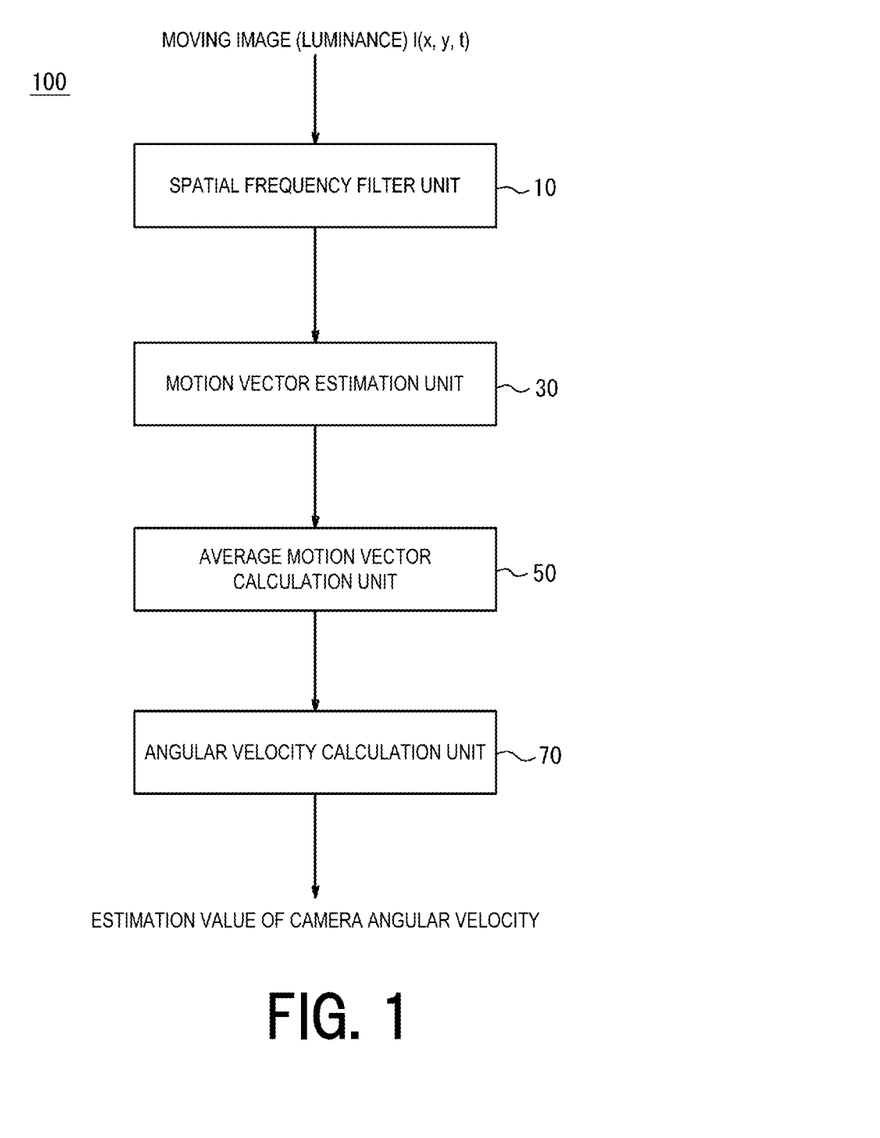
FIG. 1 is a block diagram illustrating a configuration of a video processing apparatus according to an embodiment of the present disclosure.

As illustrated in FIG. 1, the video processing apparatus 100 according to the present embodiment includes a spatial frequency filter unit 10, a motion vector estimation unit 30, an average motion vector calculation unit 50, and an angular velocity calculation unit 70. The spatial frequency filter unit 10 extracts a low spatial frequency component of luminance of an input moving image. The vector estimation unit 30 estimates a motion vector of the moving image by using a luminance gradient method, for the moving image that has been passed through the spatial frequency filter unit 10. The average motion vector calculation unit 50 averages motion vectors of a plurality of regions in the moving image and calculates an average motion vector. The angular velocity calculation unit 70 calculates angular velocity of the camera from the average motion vector. Note that each of the above-described function units may be configured to be controlled by a control unit not illustrated in FIG. 1.

Figure 2:
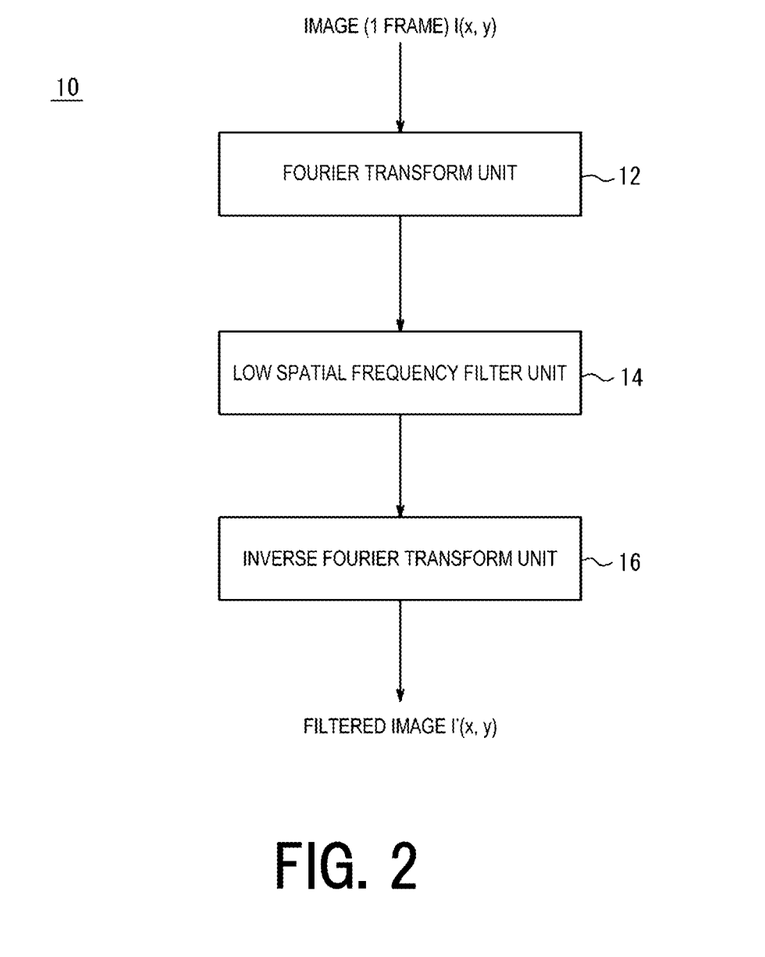
FIG. 2 is a block diagram illustrating a configuration of a spatial frequency filter unit of FIG. 1.

Hereinafter, each pixel value of each frame image is denoted as I(x, y). Here, x and y are pixel indices in a horizontal direction and a vertical direction of the image, respectively. A moving image is a time sequence of frame images, and a pixel value in a frame t is denoted as I(x, y, t), wherein t is a time index. Note that, the expression "Image I(x, y)" that uses the symbol of the pixel value may be used in the following description in order to refer to all pixel values in the image. As illustrated in FIG. 2, the spatial frequency filter unit 10 according to the present embodiment includes a Fourier transform unit 12, a low spatial frequency filter unit 14, and an inverse Fourier transform unit 16. The Fourier transform unit 12 performs Fourier transform on an input of each frame image I(x, y) constituting a moving image I(x, y, t), and outputs frequency data:

[Math. 1]

$$\tilde{I}(f_x, f_y)$$

(hereinafter, described in the text as $\tilde{I}(f_x, f_y)$). The low spatial frequency filter unit 14 weights the frequency data $\tilde{I}(f_x, f_y)$ with predefined frequency weight $F(f_x, f_y)$ to allow a low spatial frequency component to be passed through. The inverse Fourier transform unit 16 performs inverse Fourier transform on the filtered frequency data:

[Math. 2]

$$\tilde{I}'(f_x, f_y)$$

(hereinafter, described in the text as $\tilde{I}'(f_x, f_y)$), and outputs a filtered image I'(x, y). The filtered image I'(x, y) is an image acquired by extracting a low spatial frequency component from the original image I(x, y). Here, $\tilde{I}(f_x, f_y)$ refers to a value of $(f_x, f_y)$ element of the frequency data, and $F(f_x, f_y)$ refers to weight corresponding to the $(f_x, f_y)$ element. Note that the calculations of the above-described $\tilde{I}(f_x, f_y)$, $\tilde{I}'(f_x, f_y)$, and I'(x, y) can be performed by the following equations.

First, the frequency data $\tilde{I}(f_x, f_y)$ generated by Fourier transform on the image I(x, y) performed by the Fourier transform unit 12 is determined by the following equation (1).

[Math 3]

$$\tilde{I}(f_x, f_y) = \sum_{x=0}^{M-1}\sum_{y=0}^{N-1} I(x, y) e^{-2\pi i\left(\frac{f_x x}{M} + \frac{f_y y}{N}\right)} \quad (1)$$

If

[Math. 4]

$$w(x, y; f_x, f_y) = e^{-2\pi i\left(\frac{f_x x}{M} + \frac{f_y y}{N}\right)},$$

then, the right side of the equation (1) can be expressed as follows.

[Math. 5]

$$\sum\sum I(x, y) \cdot w(x, y)$$

This is parallel filter processing in which fixed weight w(x, y) is applied for each set of spatial frequencies $f_x$, $f_y$.

Next, the frequency data $\tilde{I}'(f_x, f_y)$ filtered by the low spatial frequency filter unit 14 is determined by the following equation (2).

[Math. 6]

$$\tilde{I}'(f_x, f_y) = F(f_x, f_y) \cdot \tilde{I}(f_x, f_y) \quad (2)$$

where $F(f_x, f_y)$ is the predefined frequency weight corresponding to the set of spatial frequencies $f_x$, $f_y$.

Next, the filtered image I'(x, y) generated by inverse Fourier transform on the filtered frequency data $\tilde{I}'(f_x, f_y)$ performed by the inverse Fourier transform unit 16 is determined by the following equation (3).

[Math. 7]

$$I'(x, y) = \frac{1}{MN}\sum_{f_x=0}^{M-1}\sum_{f_y=0}^{N-1} \tilde{I}'(f_x, f_y) e^{2\pi i\left(\frac{f_x x}{M} + \frac{f_y y}{N}\right)} \quad (3)$$

Similarly to the case of the Fourier transform of the equation (1), if

[Math. 8]

$$w'(f_x, f_y; x, y) = e^{2\pi i\left(\frac{f_x x}{M} + \frac{f_y y}{N}\right)},$$

then, the right side of the equation (3) can be expressed as follows.

[Math. 9]

$$\sum\sum \tilde{I}'(f_x, f_y) \cdot w'(f_x, f_y)$$

This is parallel filter processing in which fixed weight $w'(f_x, f_y)$ is applied for each set of pixel positions x, y.

As described above, the processing in the spatial frequency filter unit 10 is multistage filter processing performed in an order of the equations (1) to (3), and the equations (1) and (3) are parallel filter processing that can be performed in parallel. That is, the processing in the spatial frequency filter unit 10 is multistage parallel filter processing that does not include a conditional branch, and thus, the calculation load is light. Moreover, the calculation load can further be suppressed by using fast Fourier transform in the processing in the equations (1) and (3).

Note that an optimal cutoff spatial frequency $f_x^{cut}$ [cycle/deg.] for the filter processing performed by the low spatial frequency filter unit 14 can be represented by the following equation (4), based on a frame rate $f_t$ [frame/s] of a camera that captures a moving image and maximum angular velocity of the camera $v_{max}$ [deg./s].

[Math. 10]

$$f_x^{cut} = \left|\frac{f_t}{2v_{max}}\right| [\text{cycle}/deg.] \quad (4)$$

The equation (4) can be modified to the following equation (5).

[Math. 11]
$$f_t = |2v_{max} f_x^{cut}| [\text{frame/s}] \qquad (5)$$

The equation (5) denotes sampling theorem for time frequency. To reliably record the movement of stripes having the spatial frequency $f_x^{cut}$ [cycle/deg.] which moves at the maximum angular velocity $v_{max}$ [deg./s], a frame rate that is two times or more of $v_{max} * f_x^{cut}$ [frame/s] is required. In contrast, in a case where the frame rate is $f_t$ [frame/s], a spatial frequency of $f_t/2v_{max}$ [cycle/deg.] or less reliably represents a video motion generated when the camera rotates. Thus, the optimal cutoff frequency can be determined as represented by the equation (4).

Note that in the present embodiment, the spatial frequency filter unit 10 is configured to function as a low-pass filter, but the spatial frequency filter unit 10 is not limited to this aspect, and may be configured as a bandpass filter that allows mainly a low spatial frequency component to be passed through. In the present embodiment, the spatial frequency filter unit 10 is configured to be achieved in a spatial frequency region using the Fourier transform, but the spatial frequency filter unit 10 is not limited to this aspect, and may be configured to be achieved, by using a filter G(x, y) obtained by performing the inverse Fourier transform on the frequency weight F($f_x$, $f_y$) based on nature of the Fourier transform, as a convolution operation between the image I(x, y) and the filter G(x, y) in a real space region.

The motion vector estimation unit 30 according to the present embodiment estimates a motion vector from the moving image I'(x, y) obtained by extracting a low spatial frequency component. This estimation of the motion vector can be performed, for example, by the Lucas-Kanade method described in NPL 4 for estimating a motion vector from the luminance gradient in the moving image. However, the estimation is not limited to this aspect, and various techniques such as the generalized gradient method described in Reference 1 can be used.

(Reference 1) Miike, Osa, Miura, Sugimura, "Detecting Optical Flow with a Generalized Gradient Method: Measuring Object Motion under Non-uniform Illumination," Journal of Information Processing Society of Japan: Computer Vision and Image Media (CVIM) (2008)

The Lucas-Kanade method used in the present embodiment to estimate a motion vector is a technique of estimating a motion vector at each pixel position from a local luminance gradient in a moving image, and is multistage parallel processing that does not include a conditional branch in the calculation process as with the processing in the spatial frequency filter unit 10. Thus, the calculation load can be significantly suppressed compared to the estimation of a motion of the camera by the epipolar geometry, and the like.

The average motion vector calculation unit 50 averages motion vectors generated by the motion vector estimation unit 30, and generates an average motion vector. In generating an average motion vector, an average value may be calculated for the entire region of the moving image, or an average value may be calculated for a subregion of the moving image. In a case where motion vectors in a subregion of the moving image are used, a region containing much noise due to, for example, being exposed to less light may be excluded from a calculation object, or a region including a moving object may be excluded from the calculation object as described later. For specifying a region to be excluded, a self-evaluation technique for a motion vector such as that in Reference 2 can be used.

(Reference 2) Shigeru Ando, "A Velocity Vector Field Measurement System Based on Spatio-Temporal Image Derivative," Collection of Papers of the Society of Instrument and Control Engineers (1986) 22(12), p. 1330-1336, Internet <URL: https://doi.org/10.9746/sicetr1965.22.1330>

For the above-described calculation of the motion vector, a configuration may be applied in which a moving object in the moving image is tracked by using an object tracking technique and a motion vector is calculated from an image of a region not including the object and its vicinity, or a configuration may be applied in which a motion vector of the region not including the moving object and its vicinity is output when outputting the motion vector. For estimating, based on a moving image, angular velocity of a camera that has captured the moving image, if an object that is actually moving is excluded from the calculation object of the motion vector, then calculated motion vectors only include motion vectors based on a motion of the camera, and thus, the estimation accuracy of the angular velocity is thought to be improved.

The angular velocity calculation unit 70 calculates, from the average motion vector generated by the average motion vector calculation unit 50, angular velocity of the camera that has captured the moving image. The motion of the camera includes a motion in a rotational direction and a motion in a translational direction, and a motion (blur) of the moving image caused by the motion of the camera is mainly due to the rotational motion of the camera. Thus, the angular velocity calculation unit 70 calculates the angular velocity of the camera by assuming that motion vectors in a vertical direction and a horizontal direction of the moving image correspond to the motion in the rotational direction of the camera.

In FIG. 1, each of the processing in the spatial frequency filter unit 10, the motion vector estimation unit 30, the average motion vector calculation unit 50, and the angular velocity calculation unit 70 can be performed as software processing by, for example, executing a prescribed program on a Central Processing Unit (CPU), a Graphics Processing Unit (GPU), and a Digital Signal Processor (GSP) included in the video processing apparatus 100. However, the configuration is not limited to this aspect, and the processing in each of the function units may be configured to be achieved as hardware processing by using, for example, an Application Specific Integrated Circuit (ASIC), a Programmable Logic Device (PLD), or a Field Programmable Gate Array (FPGA).

The prescribed program is stored in a storage unit (not illustrated) within or outside the video processing apparatus 100. The storage unit includes a non-transitory readable storage medium, and the storage medium includes a magnetic disk storage medium, a magnetic cassette, a magnetic tape, other magnetic and optical storage devices (for example, a Compact Disk (CD), a laser disk (registered trademark), a Digital Versatile Disc (DVD) (registered trademark), a floppy (registered trademark) disk, and a Blu-ray disk (registered trademark)), a rewritable programmable ROM such as EPROM, EEPROM or a flash memory, other tangible storage media capable of storing information, or any combination thereof.

Figure 3:
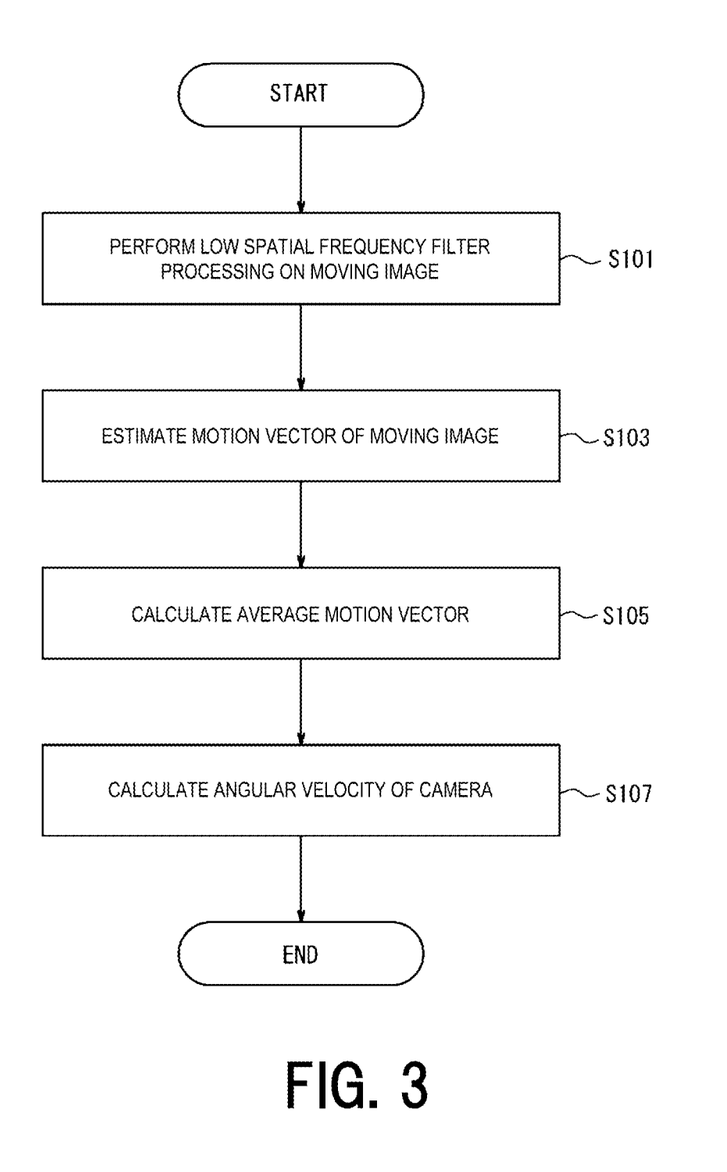
FIG. 3 is a flowchart illustrating a processing procedure of a video processing method according to the embodiment of the present disclosure.

Next, a procedure of a video processing method according to the present embodiment will be described using FIG. 3.

First, the video processing apparatus 100 performs low spatial frequency filter processing on an input moving image $I(x, y, t)$ by using the spatial frequency filter unit 10 (step S101). The spatial frequency filter unit 10 causes the Fourier transform unit 12 to perform Fourier transform on an input of an image $I(x, y)$ of each frame constituting the moving image $I(x, y, t)$ to output frequency data $\Gamma(f_x, f_y)$. Next, the video processing apparatus 100 causes the low spatial frequency filter unit 14 to weight the frequency data $\Gamma(f_x, f_y)$ with predefined frequency weight $F(f_x, f_y)$ to allow a low spatial frequency component to be passed through. Finally, the video processing apparatus 100 causes the inverse Fourier transform unit 16 to perform inverse Fourier transform on a filtered frequency data $\Gamma'(f_x, f_y)$ to output a filtered image $I'(x, y)$.

Next, the video processing apparatus 100 calculates a motion vector by using the motion vector estimation unit 30, from a time sequence (moving image) of the images $I'(x, y)$ obtained by extracting a low spatial frequency component in step S101 (step S103). The calculation of the motion vector may be performed for the entire region of the moving image, or may be performed by selecting a region suitable for estimating the motion of the camera.

Next, the video processing apparatus 100 estimates, by using the average motion vector calculation unit 50, an average motion vector from the motion vector of the moving image estimated in step S103 (step S105). The calculation of the average motion vector may be performed for the entire region of the moving image, or motion vectors of the region suitable for estimating the motion of the camera may be selected and averaged.

Next, the video processing apparatus 100 calculates, by using the angular velocity calculation unit 70, angular velocity of the camera that has captured the moving image, from the average motion vector calculated in step S105 (step S107).

In the embodiments described above, an example has been described in which the angular velocity of the camera is calculated, based on an analytical technique, from a moving image obtained by extracting a low spatial frequency component; however, the present disclosure is not limited to the analytical technique, and machine learning or the like may be used.

As an example, a case in which the angular velocity calculation unit 70 is replaced by machine learning will be described. In this case, the angular velocity calculation unit 70 is configured to include a learned model for angular velocity estimation. Training for the learned model for angular velocity estimation is performed in advance by providing training data, which includes pairs of average motion vector and angular velocity data, to a model (neural network or the like) in which an appropriate initial value is set. Regarding the learning method, a known machine learning method may be used. In addition, in the angular velocity calculation unit 70, the average motion vector calculated in step S105 is input into the learned model for angular velocity estimation, and a result output from the model is used as a calculation result of the camera angular velocity (estimation value of the angular velocity).

Even in a case where the angular velocity is determined from the motion vector in an analytical manner, if an estimation error and the like of the motion vector caused by optical aberration and the like of camera lens is provided in advance as a correction coefficient, the estimation error and the like of the motion vector can be corrected in a similar manner.

Similarly, the average motion vector calculation unit 50 can be replaced by machine learning. That is, a learned model that receives the motion vector as input and outputs the average motion vector is prepared, and the average motion vector calculation unit 50 uses this learned model to convert an input motion vector into an average motion vector and output the average motion vector. In this case, if the model is trained by using, as an input of the model, the motion vector as well as the moving image (or a feature of moving image) as input, the average motion vector calculation unit 50 can output an average motion vector using the moving image and the motion vector as input. As a result, it can be expected to obtain an estimation result of the average motion vector in consideration of estimation errors and the like of the motion vector caused by optical aberration and the like of the camera lens.

Alternatively, if a collection of sets of moving images and angular velocity of the camera is prepared as training data, and a learned model that receives a moving image as input and outputs angular velocity of the camera is prepared, then the motion vector estimation unit 30, the average motion vector calculation unit 50, and the angular velocity calculation unit 70 can be replaced by one processing block that obtains an estimation result of the angular velocity of the camera directly from the moving image based on the learned model.

As described above, the video processing apparatus 100 according to the present embodiment is configured to include the spatial frequency filter unit 10 configured to extract a low spatial frequency component of a moving image, and the angular velocity calculation unit 70 configured to calculate, based on a moving image that has been passed through the spatial frequency filter unit 10, angular velocity of a camera that has captured the moving image. Employing such a configuration makes it possible to extract motion vectors that are highly correlated with the angular velocity of the camera, from the moving image and accurately estimate the angular velocity of the camera, as described later.

As a motion vector included in a video (moving image), there is a motion vector caused by camera motion, and a motion vector caused by a physically moving object. In general, the motion vector caused by camera motion tends to appear as a global change in luminance component (global luminance change), and the motion vector caused by a physically moving object tends to appear as a local change in luminance component (local luminance change). In other words, the global luminance change can be said to be highly correlated with the camera motion (angular velocity of the camera).

A motion vector estimation technique based on a luminance gradient, such as the Lucas-Kanade method, does not distinguish what factors has caused the motion vector. If the luminance gradient method is applied to a raw video prior to application of a spatial frequency filter, many motion vectors that are highly correlated with a physically moving object or the like are also calculated in addition to the motion vectors that are highly correlated with the camera motion, but these motion vectors cannot be distinguished from each other, which makes it difficult to accurately estimate the camera motion.

In contrast, in a moving image that has been passed through the spatial frequency filter unit 10, many global luminance changes are included and the local luminance change is suppressed, and thus, the motion vector based on the global luminance change that is highly correlated with the angular velocity of the camera is likely to be calculated.

Cutting in advance a high spatial frequency component from an input video makes it possible to estimate the angular velocity of the camera with higher accuracy compared to a case in which a raw video is used as input, without changing the technique itself used for motion vector estimation.

Note that, as described above, for determining the angular velocity of the camera from a video, machine learning or the like can be used in place of a well-known luminance gradient method. In this case as well, by using an image containing only a low spatial frequency component as an input for a model that outputs the angular velocity of the camera using a video as input, a feature that is highly correlated with the angular velocity of the camera is likely to be extracted. As a result, the improvement in estimation accuracy of output camera angular velocity can be expected.

As described above, in the present invention, the spatial frequency filter unit 10 configured to extract a low spatial frequency component of a moving image is provided, and the angular velocity of the camera is estimated based on the image obtained by extracting a low spatial frequency component by the spatial frequency filter unit 10.

In the present embodiment, further included is the motion vector estimation unit 30 configured to estimate a motion vector by using the luminance gradient method, for a moving image that has been passed through the spatial frequency filter unit 10, and the angular velocity calculation unit 70 is configured to calculate the angular velocity of the camera that has captured the moving image from the motion vector. Employing such a configuration makes it easier to obtain a motion vector based on a global luminance change that is highly correlated with the angular velocity of the camera when estimating the motion vector from the moving image by using the luminance gradient method, and thus, the angular velocity of the camera can be estimated with higher accuracy. In addition to this, the angular velocity of the camera is estimated using the motion vector estimated by using the luminance gradient method with light calculation load, and thus, the calculation load can be reduced as compared to a case using the prior art.

In the present embodiment, further included is the average motion vector calculation unit 50 configured to average motion vectors of a region in the moving image to calculate an average motion vector, and the angular velocity calculation unit 70 is configured to calculate the angular velocity of the camera that has captured the moving image from the average motion vector. Employing such a configuration makes it possible to improve the estimation accuracy of the angular velocity of the camera by using an average value of motion vectors for the entire region or a subregion of the moving image, even when an object that impairs the estimation of the angular velocity of the camera, such as a moving object, is captured in the moving image.

In the present embodiment, a cutoff frequency of the spatial frequency filter unit 10 is configured to be determined based on a frame rate of the camera that has captured the moving image and maximum angular velocity of the camera. Employing such a configuration makes it possible to suppress aliasing in a time direction, and to reliably detect a luminance gradient when the camera rotates.

Alternatively, the cutoff frequency of the spatial frequency filter unit 10 may be configured to be determined based on at least one of a size or speed of a moving object included in the moving image, as described in Examples described later.

In the present embodiment, the Lucas-Kanade method is used as a luminance gradient method used in estimating a motion vector in the motion vector estimation unit 30. Employing such a configuration makes it possible to perform low spatial frequency filter processing and motion vector estimation by multistage parallel processing that does not include a conditional branch or a corresponding point search in the calculation process, and thus, the calculation load for estimating, from a moving image, the motion (angular velocity) of a camera that has captured the moving image can be suppressed.

The video processing method according to the present embodiment is configured to include extracting a low spatial frequency component of a moving image, and calculating angular velocity of a camera that has captured the moving image, based on the moving image obtained by extracting a low spatial frequency component. Employing such a configuration makes it possible to extract a motion that is highly correlated with the angular velocity of the camera, from the moving image, and accurately estimate the angular velocity of the camera.

Although the present disclosure has been described with reference to drawings and examples, it should be noted that various variations and modifications can be easily made by a person skilled in the art based on the present disclosure. Thus, it should be noted that these variations and modifications are within the scope of the present invention. For example, functions and the like included in each of the components, steps, and the like can be rearranged so as to not be logically inconsistent, and a plurality of components, steps, and the like can be combined together or divided.

For example, in the present embodiment, one video processing apparatus 100 is configured to include the spatial frequency filter unit 10, the motion vector estimation unit 30, the average motion vector calculation unit 50, and the angular velocity calculation unit 70, but the present invention is not limited to this aspect. For example, processing performed by the spatial frequency filter unit 10 and the motion vector estimation unit 30 may be performed on a server, and processing performed by the average motion vector calculation unit 50 and the angular velocity calculation unit 70 may be performed in a Personal Computer (PC), a smart phone, or a tablet PC.

EXAMPLES

Figure 4:
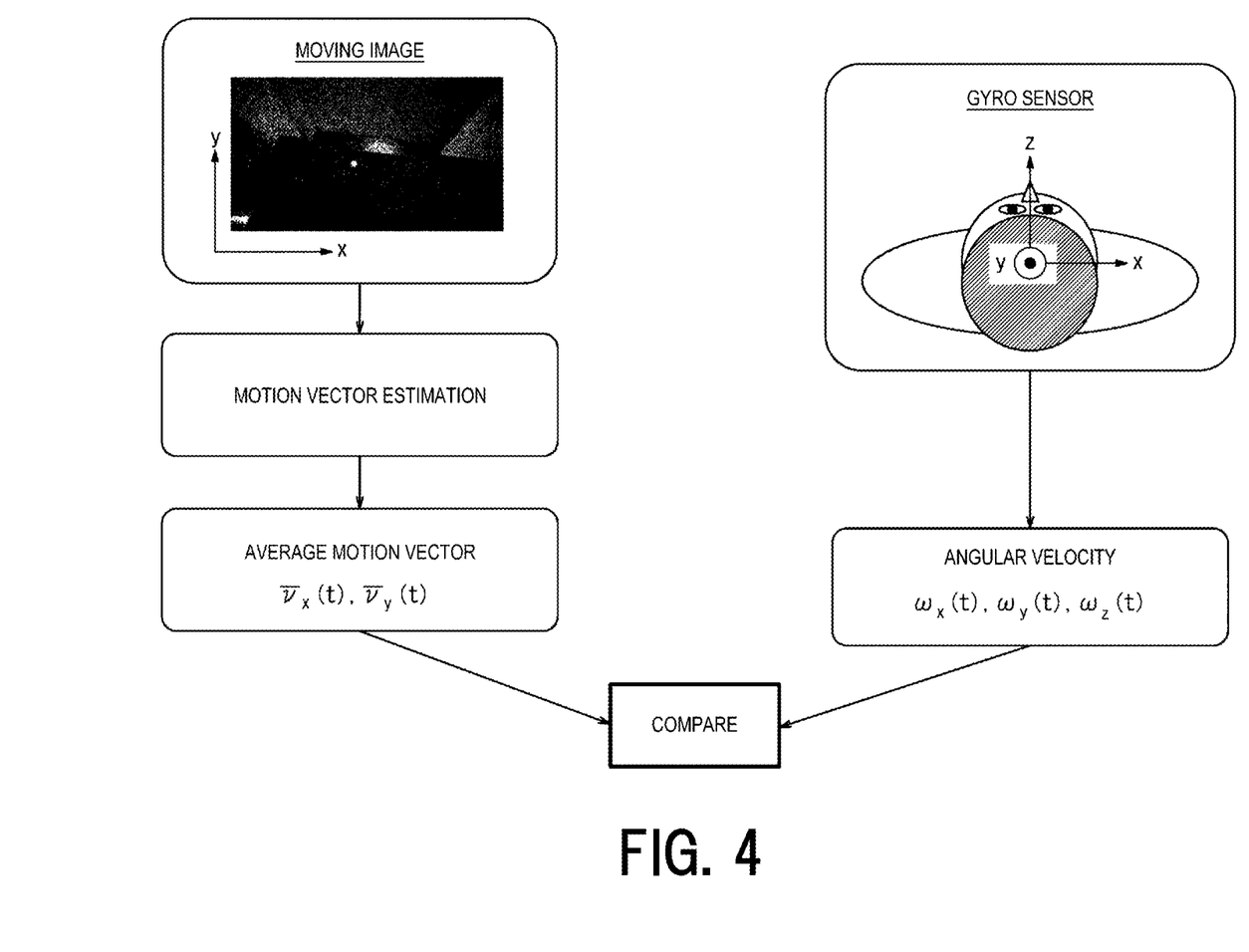
FIG. 4 is a block diagram illustrating a technique for determining a correlation between an average motion vector of a moving image estimated by the video processing apparatus according to the embodiment of the present disclosure and angular velocity of a camera obtained by a gyro sensor.

Next, angular velocity of a camera that captures a moving image was estimated from the moving image by using the video processing apparatus 100 according to the present embodiment to verify accuracy of the angular velocity estimation. As illustrated on the upper right of FIG. 4, the verification of the estimation accuracy of the angular velocity of the camera was performed by mounting, on a head of a person, a gyro sensor in addition to the camera for taking moving images, and comparing angular velocity around each of axes of the head of the person obtained from the gyro sensor with an average motion vector estimated from a moving image (illustrated in the upper left of FIG. 4) captured by the camera. Note that, a motion in an x-axis direction occurs on the moving image due to rotation of the head about a y-axis, and a motion in the y-axis direction occurs on the moving image due to rotation of the head about the x-axis. Thus, in comparing the output of the gyro sensor with the average motion vector of the moving image, a motion vector in the x-axis direction of the moving image:

[Math. 12]

$$\tilde{v}_x(t)$$

(hereinafter, described in the text as $\tilde{v}_x(t)$ was compared with angular velocity $\omega_y(t)$ about the y-axis of the head (gyro sensor), and a motion vector $\tilde{v}_y(t)$ in the y-axis direction of the moving image was compared with angular velocity $\omega_x(t)$ about the x-axis of the head (gyro sensor). Comparison results are shown in FIGS. 5A to 5C.

Figure 5A:
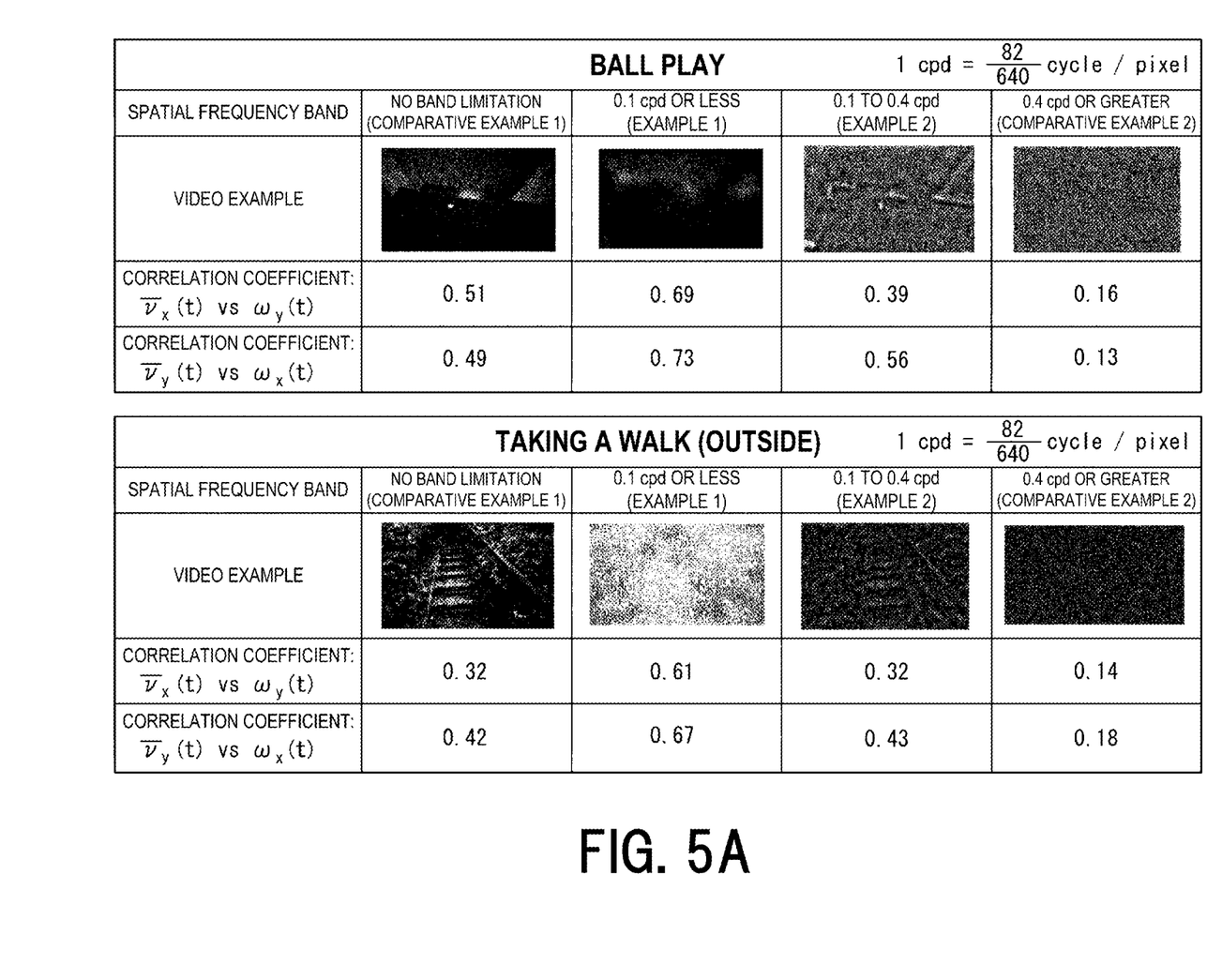
FIG. 5A shows the determined result of correlation between the average motion vector of the moving image and the angular velocity of the camera obtained by the gyro sensor, according to the technique illustrated in FIG. 4.
Figure 5B:
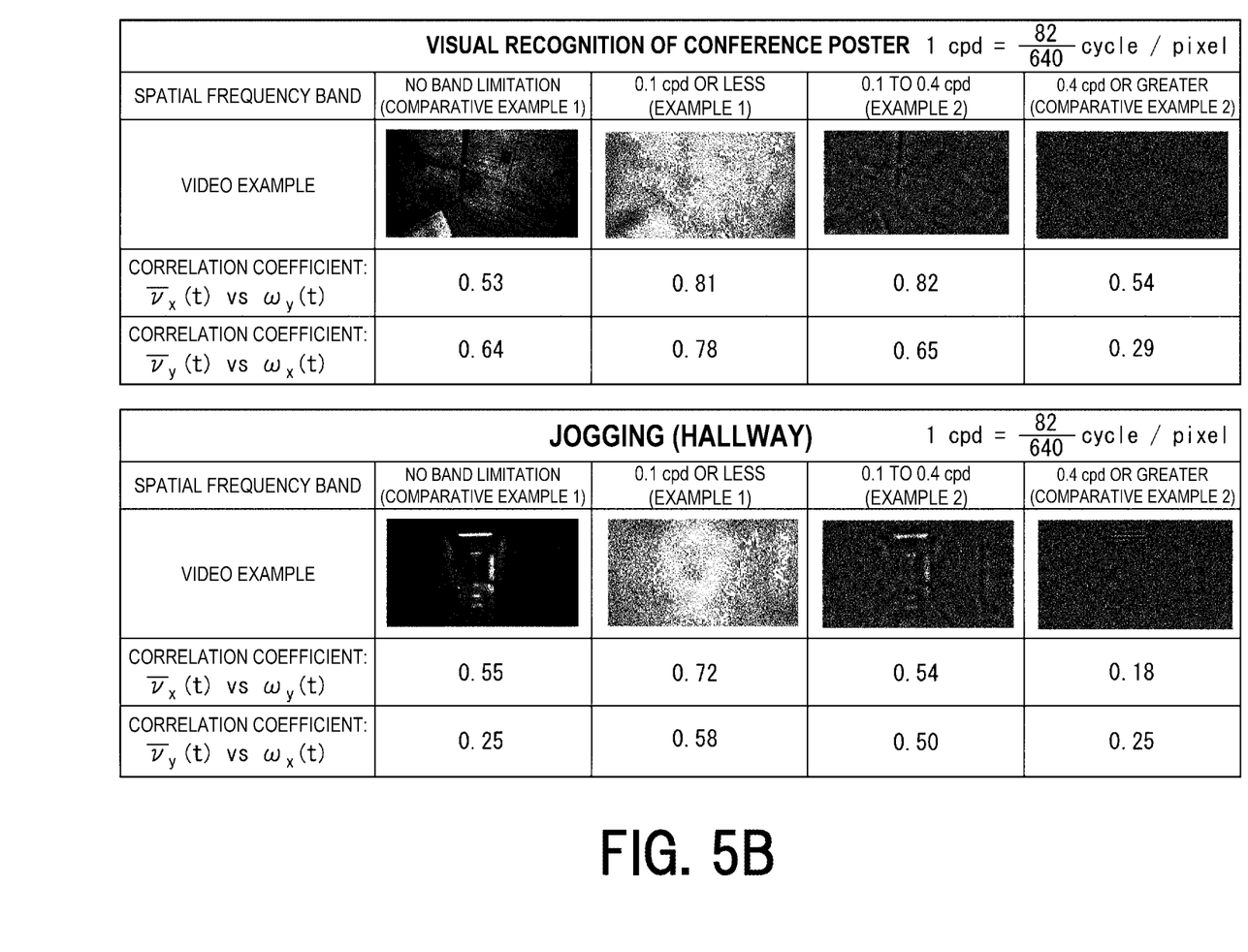
FIG. 5B shows the determined result of correlation between the average motion vector of the moving image and the angular velocity of the camera obtained by the gyro sensor, according to the technique illustrated in FIG. 4.
Figure 5C:
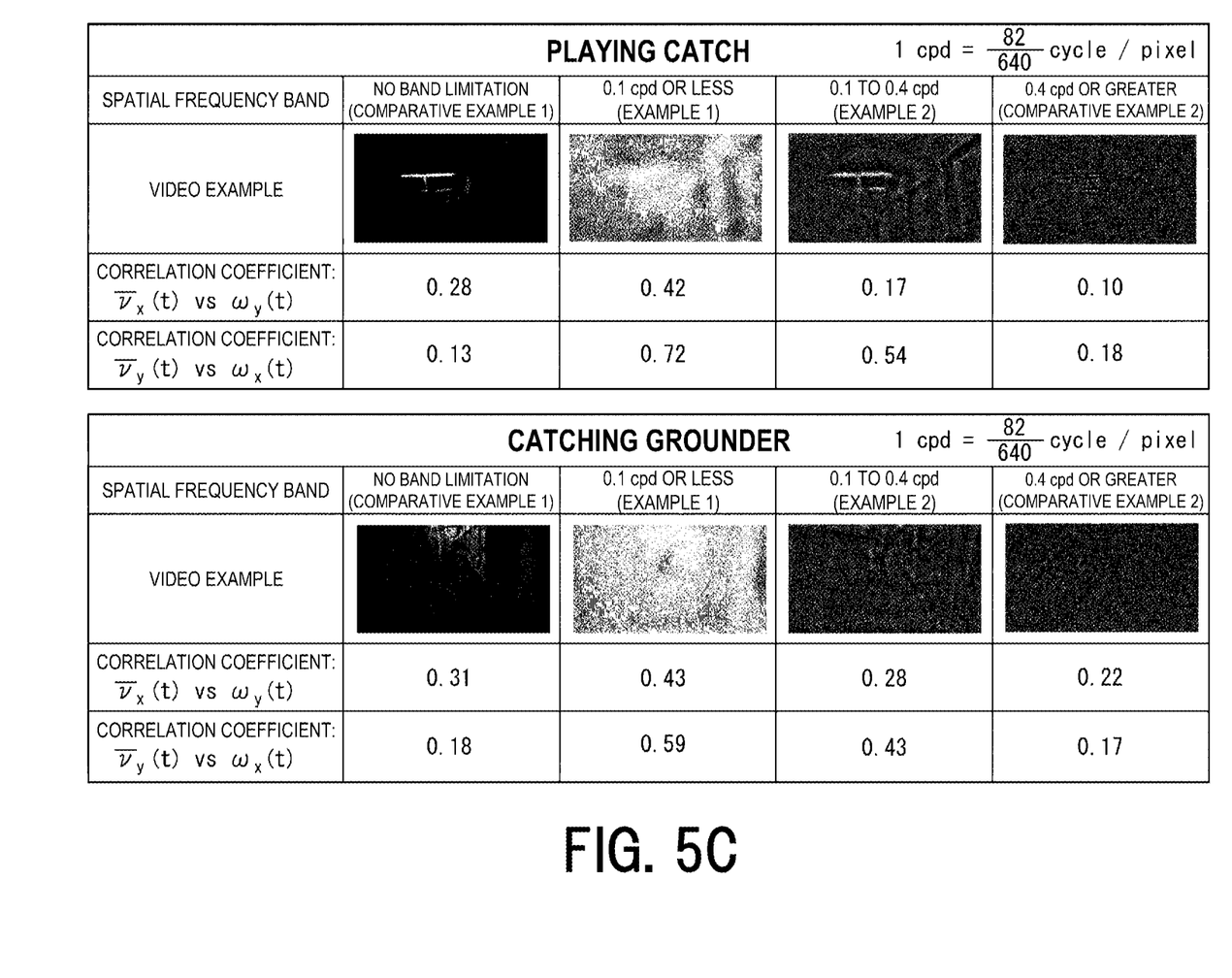
FIG. 5C shows the determined result of correlation between the average motion vector of the moving image and the angular velocity of the camera obtained by the gyro sensor, according to the technique illustrated in FIG. 4.

On the upper part of FIG. 5A, for a moving image that captures a situation of playing with a ball with a camera being mounted on the head of a person, results are shown obtained by comparing an average motion vector estimated from the moving image with angular velocity output from the gyro sensor arranged adjacent to the camera. In a case where no band limitation is applied (Comparative Example 1), correlation coefficients between the average motion vectors in the x-axis and y-axis directions and each of values of the gyro sensor were 0.51 and 0.49, respectively. In contrast, in a case where a low spatial frequency filter with a spatial frequency of 0.1 cycle per degree (cpd) (this Example employed an image having 640 pixels with respect to an angle of view 82°, thus 1 cpd=82/640 (cycle/pixel)) (Example 1), the correlation coefficients between the average motion vectors in the x-axis and y-axis directions and each of values of the gyro sensor were improved to 0.69 and 0.73, respectively. This indicates that extracting a spatial frequency component of 0.1 cpd or less in the moving image makes it possible to more accurately estimate the motion vector caused by head rotation (camera motion). In other words, it is considered that in an image that had been passed through a low spatial frequency filter of 0.1 cpd or less, many (sufficient) global luminance changes caused by head rotation (camera motion) were included and local luminance changes caused by the motion of a ball were suppressed, and thus, the rotational motion of the camera could be estimated with higher accuracy. Thus, depending on the moving image, to suppress influence of a moving object such as a ball, a cutoff frequency of the filter may be determined based on the size of or the speed of the moving object, for example.

In this ball play example, in a case where a bandpass filter of 0.1 to 0.4 cpd was employed (Example 2), the correlation coefficients between the motion vectors in the x-axis and y-axis directions and each of values of the gyro sensor were 0.39 and 0.56, respectively, and there was little improvement in the correlation coefficients when compared to the case of no band limitation (Comparative Example 1). It is thought that this is because in the moving image of ball play, image information including local luminance gradient caused by the motion of the ball, which was a moving object, was considerably included even in the moving image that had been passed through the bandpass filter of 0.1 to 0.4 cpd, and thus, due to the motion of the ball independent of the motion of the camera, a motion that was less correlated with the motion of the camera tended to be extracted as the motion vector. In a case where a high-pass filter of 0.4 cpd or greater was employed (Comparative Example 2), the correlation coefficients between the motion vectors in the x-axis and y-axis directions and each of values of the gyro sensor were 0.16 and 0.13, respectively, and thus it is considered that there was almost no image information including a global luminance gradient, which is necessary for calculation of the motion vector caused by head rotation (camera motion).

On the lower part of FIG. 5A, for a moving image that captures a situation of taking a walk outside with a camera being mounted on the head of a person, results are shown obtained by comparing an average motion vector estimated from the moving image with angular velocity output from a gyro sensor arranged adjacent to the camera. In a case where no band limitation was applied (Comparative Example 1), the correlation coefficients between the average motion vectors in the x-axis and y-axis directions and each of values of the gyro sensor were 0.32 and 0.42, respectively. In contrast, in a case where the low spatial frequency filter with a cutoff frequency of 0.1 cpd was applied (Example 1), the correlation coefficients between the motion vectors in the x-axis and y-axis directions and each of values of the gyro sensor were improved to 0.61 and 0.67, respectively. It is thought that this is because, as in the case of ball play, much more image information including a global luminance gradient caused by head rotation (camera motion) could be extracted by extracting a spatial frequency component of 0.1 cpd or less of the moving image when calculating the motion vector from the moving image.

On the upper part of FIG. 5B, for a moving image that captures a situation of listening to a poster presentation at a conference with a camera being mounted on the head of a person, results are shown obtained by comparing an average motion vector estimated from the moving image with angular velocity output from a gyro sensor arranged adjacent to the camera. In a case where no band limitation was applied (Comparative Example 1), the correlation coefficients between the average motion vectors in the x-axis and y-axis directions and each of values of the gyro sensor were 0.53 and 0.64, respectively. In contrast, in a case where the low spatial frequency filter with a spatial frequency of 0.1 cpd was applied (Example 1), the correlation coefficients between the motion vectors in the x-axis and y-axis directions and the gyro sensor were improved to 0.81 and 0.78, respectively. It is thought that this is because, as in the previous example, much more image information including a global luminance gradient caused by head rotation (camera motion) could be extracted by extracting a spatial frequency component of 0.1 cpd or less of the moving image when estimating the motion vector from the moving image. However, in this example of conference poster, even in a case of employing a bandpass filter of 0.1 to 0.4 cpd (Example 2), the correlation coefficient between the motion vector in the x-axis direction and the value of the gyro sensor was especially improved to 0.82. It is thought that this is because when listening to conference poster presentation, a majority of objects being captured in the moving image was stationary, and thus, the correlation with the angular velocity of the camera relatively tended to increase even for motion by a local luminance gradient. Thus, it is thought that a relatively high correlation could be achieved even for the moving image of the band of 0.1 to 0.4 cpd, which showed low correlation between the motion vector and the angular velocity of the camera in the example of ball play.

On the lower part of FIG. 5B, for a moving image that captures a situation of jogging in the hallway with a camera being mounted on the head a person, results are shown obtained by comparing an average motion vector estimated from the moving image with angular velocity output from a gyro sensor arranged adjacent to the camera. In a case where no band limitation was applied (Comparative Example 1), the correlation coefficients between the average motion vectors in the x-axis and y-axis directions and each of values of the gyro sensor were 0.55 and 0.25, respectively. In contrast, in a case where the low spatial frequency filter with a spatial frequency of 0.1 cpd was applied (Example 1), the correlation coefficients between the average motion vectors in the x-axis and y-axis directions and each of values of the gyro sensor were improved to 0.72 and 0.58, respectively. It is thought that this is because, as in the previous examples, image information including a global luminance gradient which is necessary for the calculation of the motion vector caused by head rotation (camera motion) could be selectively extracted by extracting a spatial frequency component of 0.1 cpd or less of the moving image when estimating the motion vector from the moving image. However, in this example of jogging, even in a case of employing a bandpass filter of 0.1 to 0.4 cpd (Example 2), the correlation coefficient between the motion vector in the y-axis direction and the value of the gyro sensor was especially improved to 0.50. It is thought that this is because, in the moving image that captures a jogging state, although the fast moving speed of the recorder in the y-axis direction caused aliasing in a time direction in the high spatial frequency component, and thus increase in a motion estimation error in the y-axis direction, being passed through the bandpass filter of 0.1 to 0.4 cpd resulted in reduction of influence of the aliasing and thus the motion estimation accuracy in the y-axis direction was improved.

On the upper part of FIG. 5C, for a moving image that captures a situation of playing catch with a camera being mounted on the head of a person, results are shown obtained by comparing an average motion vector estimated from the moving image with angular velocity output from a gyro sensor arranged adjacent to the camera. In a case where no band limitation was applied (Comparative Example 1), the correlation coefficients between the average motion vectors in the x-axis and y-axis directions and each of values of the gyro sensor were 0.28 and 0.13, respectively. In contrast, in a case where the low spatial frequency filter with a spatial frequency of 0.1 cpd was applied (Example 1), the correlation coefficients between the average motion vectors in the x-axis and y-axis directions and each of values of the gyro sensor were improved to 0.42 and 0.72, respectively. It is thought that this is because, as in the previous example, image information including a global luminance gradient caused by head rotation (camera motion) could be selectively extracted by extracting a spatial frequency component of 0.1 cpd or less of the moving image when estimating the motion vector from the moving image. However, in this example of playing catch, even in a case of employing a bandpass filter of 0.1 to 0.4 cpd (Example 2), the correlation coefficient between the average motion vector in the y-axis direction and the value of the gyro sensor was especially improved to 0.54. This is because in the moving image that captures a situation of playing catch, the motion of the ball, which was an moving object, was fast, and thus, image information including a local luminance gradient caused by the motion of the ball was a factor of deteriorating the correlation between the angular velocity of the camera and the motion in the y-axis direction on the moving image. However, it is thought that the image information including a local luminance gradient caused by the motion of the ball was suppressed by a bandpass filter of 0.1 to 0.4 cpd, and the correlation between the motion vector in the y-axis direction and the angular velocity of the camera was improved. This is also true for a case of catching a grounder shown on the lower part of FIG. 5C.

REFERENCE SIGNS LIST

10 . . . Spatial frequency filter unit
12 . . . Fourier transform unit
14 . . . Spatial frequency filter unit
16 . . . Inverse Fourier transform unit
30 . . . Motion vector estimation unit
50 . . . Average motion vector calculation unit
70 . . . Angular velocity calculation unit
100 . . . Video processing apparatus

The invention claimed is:

1. A video processing apparatus, comprising:
a spatial frequency filter unit configured to extract a low spatial frequency component of a moving image; and
an angular velocity calculation unit configured to calculate angular velocity of a camera that has captured the moving image, based on the moving image that has been passed through the spatial frequency filter unit.

2. The video processing apparatus according to claim 1, further comprising:
a motion vector estimation unit configured to estimate, by a gradient method, a motion vector for the moving image that has been passed through the spatial frequency filter unit,
wherein the angular velocity calculation unit calculates, from the motion vector, angular velocity of the camera that has captured the moving image.

3. The video processing apparatus according to claim 2, further comprising:
an average motion vector calculation unit configured to average a plurality of the motion vectors of a region in the moving image to calculate an average motion vector,
wherein the angular velocity calculation unit calculates, from the average motion vector, angular velocity of the camera that has captured the moving image.

4. The video processing apparatus according to claim 1, wherein a cutoff frequency of the spatial frequency filter unit is determined based on a frame rate of the camera that has captured the moving image and maximum angular velocity of the camera.

5. The video processing apparatus according to claim 1, wherein a cutoff frequency of the spatial frequency filter unit is determined based on at least one of a size or speed of a moving object included in the moving image.

6. A video processing program for causing a computer to operate as the video processing apparatus according to claim 1.

7. A video processing method, comprising:
extracting a low spatial frequency component of a moving image; and
calculating angular velocity of a camera that has captured the moving image, based on the moving image obtained by extracting a low spatial frequency component.

* * * * *